United States Patent [19]
Queen

[11] 3,856,102
[45] Dec. 24, 1974

[54] ELECTRO-HYDRAULIC STEERING SYSTEM FOR VEHICLE HAVING STEERABLE FRONT AND REAR GROUND WHEELS

[75] Inventor: William B. Queen, Cedar Rapids, Iowa

[73] Assignee: Harnischfeger Corporation, Milwaukee, Wis.

[22] Filed: July 11, 1973

[21] Appl. No.: 378,125

[52] U.S. Cl.................. 180/79.2 C, 180/45, 280/91
[51] Int. Cl............................................. B62d 5/08
[58] Field of Search..... 280/91; 180/79.2 C, 79.2 R, 180/45

[56] References Cited
UNITED STATES PATENTS

| | | | |
|---|---|---|---|
| 3,185,245 | 5/1965 | Hoyt | 180/79.2 C |
| 3,446,307 | 5/1969 | Logus | 180/79.2 C |
| 3,556,243 | 1/1971 | Susag | 180/79.2 C |
| 3,596,730 | 8/1971 | Cecce | 180/79.2 C |

Primary Examiner—Stanley H. Tollberg
Assistant Examiner—Thomas E. Kocovsky
Attorney, Agent, or Firm—James E. Nilles

[57] ABSTRACT

A rough terrain vehicle comprises a chassis, a pair of driven steerable frontground wheels and a pair of driven steerable rear ground wheels mounted on the chassis, an engine on the chassis and an upper unit rotatably mounted on the chassis. A movable boom and an operator's cab, in which vehicle and boom controls are located, are mounted on the upper unit. An electro-hydraulic steering system is provided and comprises, among other things, a separate steering cylinder for each of the four ground wheels, engine-driven hydraulic fluid pumps and a fluid reservoir, solenoid operated valves for controlling fluid flow to the steering cylinders and to certain other vehicle components, a steering wheel mechanism, and a selector switch. The selector switch and steering wheel mechanism are used cooperatively by the vehicle operator to enable three modes of steering, namely: normal steering in either direction using the front wheels only; tight steering in either direction using the front wheels and rear wheels turned in opposite directions; and crab steering in either direction using the front wheels and rear wheels turned in the same direction.

4 Claims, 11 Drawing Figures

ELECTRO-HYDRAULIC STEERING SYSTEM FOR VEHICLE HAVING STEERABLE FRONT AND REAR GROUND WHEELS

BACKGROUND OF THE INVENTION

1. Field of Use

This invention relates generally to electro-hydraulic steering systems for vehicles having steerable front and rear ground wheels. In particular, it relates to such a system wherein a steering wheel mechanism and selector switch are used cooperatively by the operator to enable several modes of steering.

2. Description of the Prior Art

The prior art discloses examples of vehicles having a pair of steerable front and a pair of steerable rear wheels, each wheel being movable for steering purposes by its own hydraulic steering cylinder, and each pair of wheels being steerable independently of the other pair. In such prior art vehicles, the steering system comprises selector means which enabled the vehicle operator to steer the front wheels or the rear wheels but not both simultaneously. These prior art systems, therefore, did not fully exploit the steering capacities of the vehicles on which they were used.

SUMMARY OF THE INVENTION

A rough terrain vehicle in accordance with the invention comprises a chassis, a pair of driven steerable front ground wheels and a pair of driven steerable rear ground wheels mounted on the chassis, an engine on the chassis and an upper unit rotatably mounted on the chassis. A movable boom and an operator's cab, in which vehicle and boom controls are located, are mounted on the upper unit. An electro-hydraulic steering system is provided and comprises, among other things, a separate steering cylinder for each of the four ground wheels, first and second engine-driven hydraulic fluid pumps and a fluid reservoir, solenoid operated valves for controlling fluid flow to the steering cylinders and to certain other vehicle components, such as outrigger cylinders, a steering wheel mechanism including a steering valve, and a three-position selector switch. The selector switch and steering wheel mechanism are used cooperatively by the vehicle operator to enable three modes of steering, namely: normal steering in either direction using the front wheels only; tight steering in either direction using the front wheels and rear wheels turned in opposite directions; and crab steering in either direction using the front wheels and rear wheels turned in the same direction.

More specifically, the electrohydraulic steering system comprises a first or front steer pump principally for supplying fluid to steer the front wheels and a second or rear steer and outrigger pump for supplying fluid to the outrigger cylinders and, when required, for supplying additional fluid to steer the rear wheels. The steering wheel mechanism includes a multiposition steering valve, responsive to steering wheel position or movement (right and left) for directing fluid to the front wheel cylinders, to steer the front wheels. The three-position mode selector switch (having conventional steer, tight steer and crab steer positions) operates a directional or steering mode solenoid valve and directs fluid from the front steer pump (through the steering valve) to the rear wheel cylinders. The selector switch also operates relays which control a cut-in valve which enables auxiliary fluid from the rear steer and outrigger pump to supplement the fluid flow from the front steer pump. Limit switches are provided which are responsive to rear wheel position and which operate when the mode selector switch is in (or returned to) conventional steer position, to actuate an automatic centering valve which then supplies fluid to said rear cylinders to center the rear wheels.

DRAWINGS

DESCRIPTION OF A PREFERRED EMBODIMENT

Figure 1:
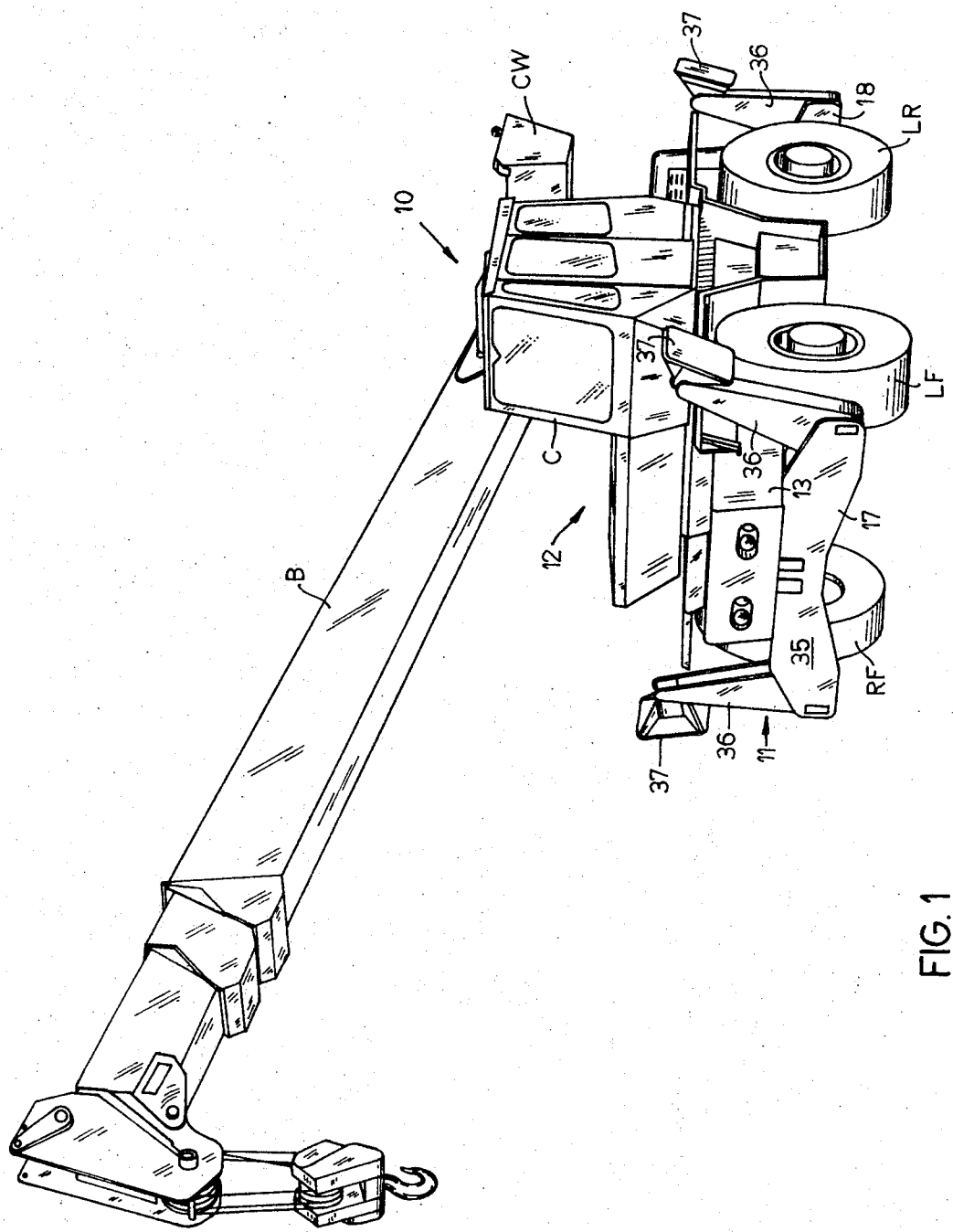
FIG. 1 is a perspective view from the front left of a rough terrain vehicle having a steering system in accordance with the invention.

Referring to FIGS. 1 through 4, the numeral 10 designates a mobile crane in accordance with the invention and comprising a lower mobile unit or rough terrain vehicle 11 and a horizontally rotatable upper crane unit 12 having a vertically movable telescopic boom B and an operators cab C. Boom B is pivotally mounted on a support frame B1 and is provided with a counterweight CW, with a winch W, and with two boom hoist cylinders HC.

Vehicle 11 comprises a chassis 13 on which are mounted a front wheel axle assembly 14, a rear wheel axle assembly 15, an internal combustion engine 16 for driving the four rubber tired vehicle wheels and two hydraulic fluid pumps FSP and RSP, hereinafter described, for supplying hydraulic components hereinafter described, a front end outrigger assembly 17, a rear end outrigger assembly 18, and a turret 20 by means of which upper crane unit 12 is rotatably mounted on chassis 13.

Front wheel axle assembly 14 is provided with a right front wheel RF and a left front wheel LF. Rear wheel axle assembly 15 is provided with a right rear wheel RR and a left rear wheel LR. Drive power for the four vehicle wheels is furnished from engine 16 through engine drive shaft 25, through a power shifting mechanism 26 mounted on chassis 13 and connected to shaft 25, and through a transmission mechanism 27 mounted on the chassis and integrally connected to shifting mechanism 26. Transmission mechanism 27 is connected by a front drive shaft 28 to a front differential 30 of front wheel axle assembly 14 and is operable to drive the wheels RF and LF which have their axles connected to the differential. Transmission mechanism 27 is connected by a rear drive shaft 31 to a rear differential 32 of rear wheel axle assembly 15 and is operable to drive the wheels RR and LR which have their axles connected to the differential.

Each outrigger assembly 17 and 18 comprises a supporting frame 35 rigidly secured to chassis 13, a pair of vertically pivotable extension legs 36 each pivotally attached at one end to frame 35 by a pin 39, an outrigger pad 37 pivotally attached to the other end of each leg 36 by a pin 40, and a pair of extendable-retractable hydraulic operating cylinders 38 each pivotally connected at its ends to and between frame 35 and a leg 36 and operable to swing its associated leg downwardly into contact with the earth in supporting position.

Figure 3:
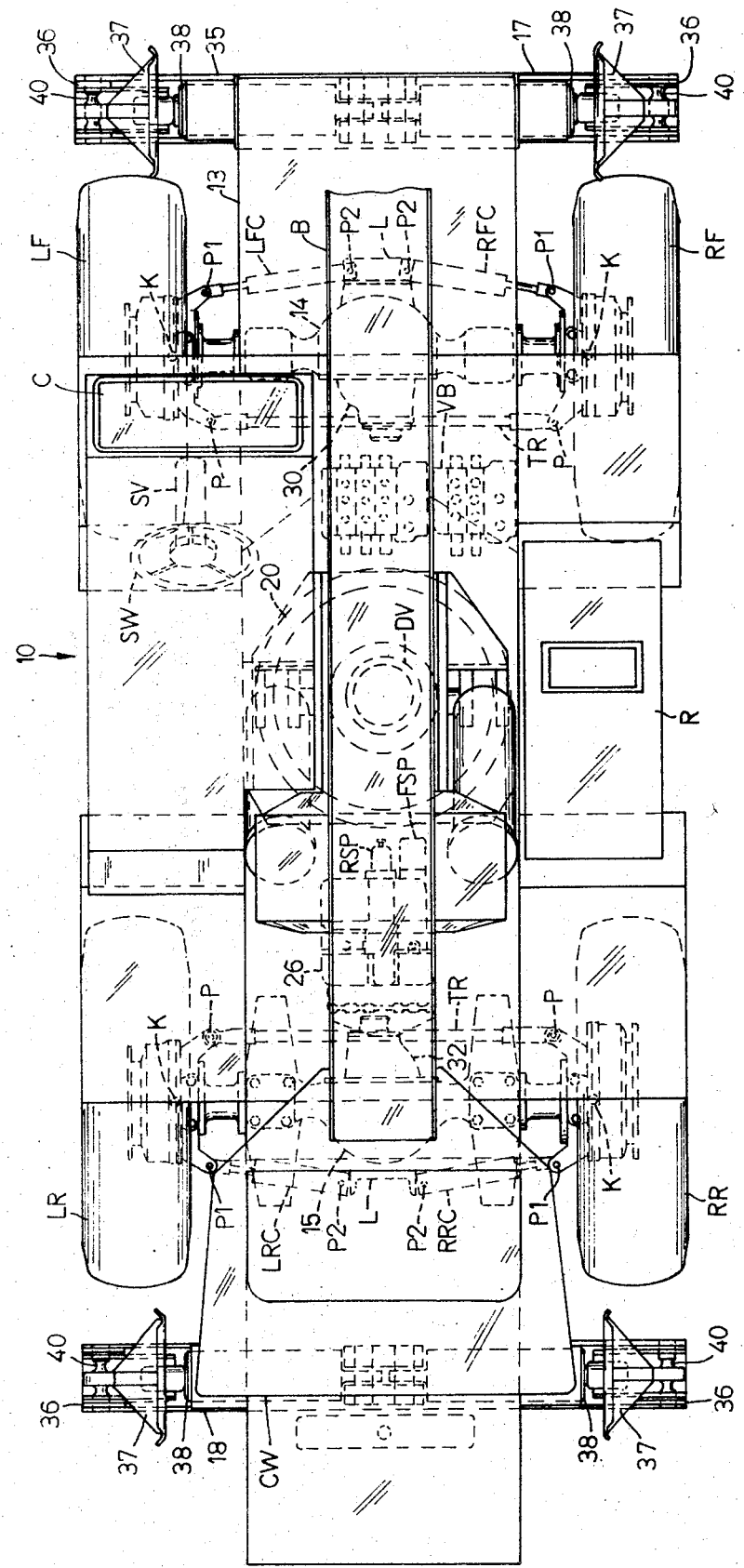
FIG. 3 is a top plan view of the vehicle shown in FIG. 1.

As FIG. 3 shows, front wheel axle assembly 14 comprises the front wheels RF and LF, each of which is pivotable about a king pin K mounted on chassis 13. The front wheels RF and LF are interconnected by a tie rod TR which is pivotally connected at its ends by pivot pins P to the wheels. A steering cylinder RFC has the end of its piston rod pivotally connected at a pivot pin P1 to wheel RF and has its base end pivotally connected by a pivot pin P2 to a stationary link L which is rigidly attached to the wheel axle housing of front wheel axle assembly 14. A steering cylinder LFC has the end of its piston rod pivotally connected by another pivot pin P1 to wheel LF and has its base end pivotally connected by another pivot pin P2 to stationary link L. Thus, when fluid is supplied to the cylinders RFC and LFC to effect steering, one of those cylinders extends its piston rod and the other retracts its piston rod to effect coordinated simultaneous steering movement of both wheels RF and LF in the chosen direction.

Rear wheel axle assembly 15 comprising the rear wheels RR and LR is similar in construction, arrangement and operation to front wheel axle assembly 14 and comprises steering cylinders RRC and LRC, having pins K, a tie rod TR, pivot pins P, P1 and P2, and a stationary link L.

Figure 2:
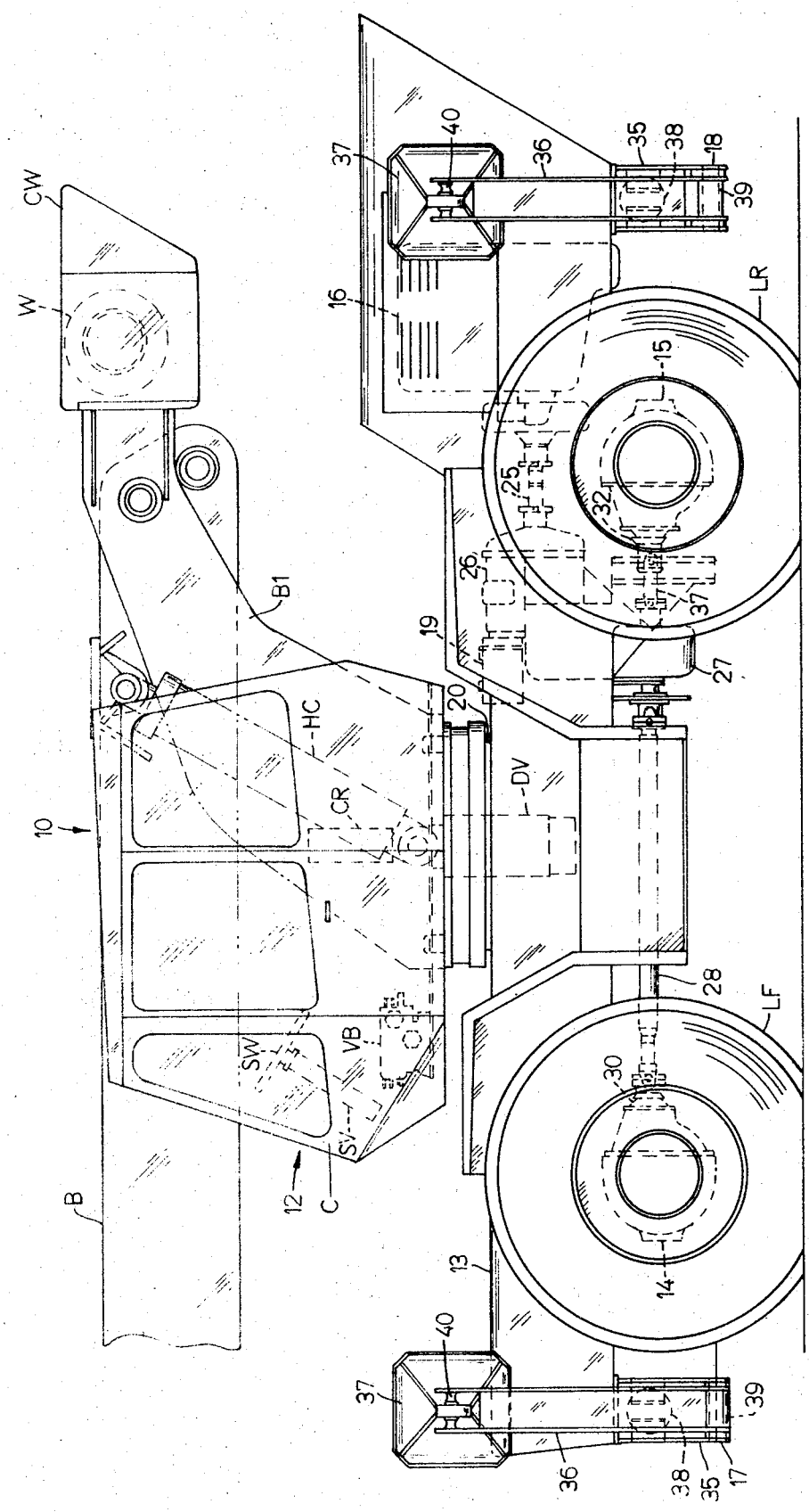
FIG. 2 is a left side elevational view of the vehicle shown in FIG. 1.
Figure 5:
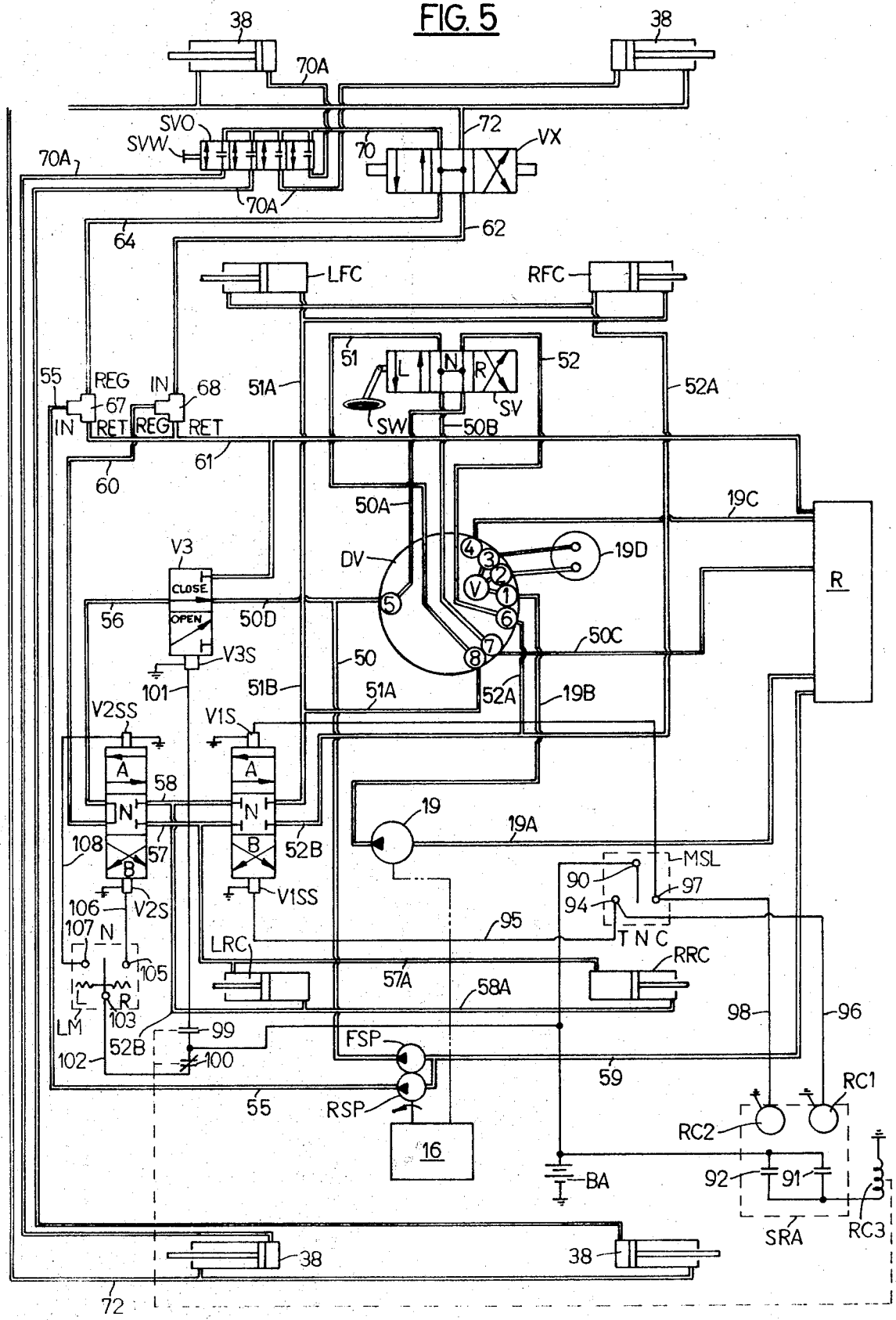
FIG. 5 is a schematic diagram of the electro-hydraulic steering system for the vehicle shown in FIGS. 1 through 4.

As FIGS. 2, 3 and 5 show, the pumps FSP and RSP are located on mechanism 26 and are driven by engine 16. Pump FSP is a front steer pump and is provided to supply operating fluid principally for the front wheel steering cylinders RFC and LFC. Pump RSP is a rear steer and outrigger pump and is provided to supply operating fluid principally to the four outrigger cylinders 38, when required, and to the rear wheel steering cylinders RRC and LRC, when required. The manually operable control valves and the manually operable electrical control switches for controlling the various functions and components of vehicle 10 are located in cab C; with the control valves being arranged in a control valve bank BV therein. Since upper unit 12 is relatively rotatable with respect to the lower vehicle unit 11, it is necessary to provide a swivel valve unit DV for hydraulic fluid distribution between the upper and lower units and also to provide an electrical collector ring unit CR for electrical power distribution between the upper and lower units. The swivel valve DV and the collector ring CR are known types of components and may take whatever form is necessary to accommodate the number of hydraulic fluid lines and electrical connectors which are required to extend between upper and lower units 12 and 11, respectively.

Hydraulic and air swivel DV is, for example, a type of unit designated part no D 1312 301-A and sold by Iowa Industrial Hydraulics Inc., Laurens, Iowa.

Generally considered, the electro-hydraulic steering system shown in FIG. 5 comprises two pumps FSP and RSP, both driven by engine 16. Pump FSP is a front steer pump principally for supplying operating fluid to the cylinders LFC and RFC to steer the fronts wheels LF and RF, respectively. Pump RSP is a rear steer and outrigger pump for supplying operating fluid to the four outrigger cylinders 38, when required and for supplying additional operating fluid to the cylinder to steer the rear wheels LR and RR, when required. A steering wheel mechanism is provided comprising a rotatable steering wheel SW and a three position power steering valve SV connected thereto and having a neutral, right and left position. Power steering valve SV is, for example, a type HGB 32 "Hydroguide" column type 2 valve (60 cubic inch reverse displacement, 31 gallons per minute system flow) sold by TRW Inc., Ross Gear Division, Lafayette, Ind. Valve SV is responsive to movement of steering wheel SW to various positions for directing fluid to the front wheel cylinders LFC and RFC, to steer the front wheels LF and RF, respectively, and, in some instances to effect steering of the rear wheels LR and RR, as herein explained. A three-position mode selector electric switch MSL (having normal or conventional steer, tight steer and crab steer positions designated by the letters N, T and C, respectively) operates a directional or steering mode three-position solenoid operated valve V1 and, in certain instances, directs fluid from the steering valve SV to the rear wheel cylinders LRC and RRc to effect tight steer or crab movement of the rear wheels LR and RR. The selector switch MSL also operates relay coils RC1 and RC2 which control the solenoid V3S of a two-position solenoid operated cut-in valve V3 to enable auxiliary fluid from the rear steer and outrigger pump RSP to supplement the fluid flow from the front steer pump FSP. Limit switches LM are provided which are responsive to rear wheel position and which operate when the mode selector switch MSL is in (or returned to) conventional steer position N, to actuate an automatic three-position solenoid operated centering valve V2 which then supplies fluid to the rear wheel cylinders LRC and RRC to center the rear wheels.

The valves V1, V2 and V3 may, for example, take the form of 12 volt DC solenoid valves, designated by the following model numbers and specifications, which are produced by the Racine Hydraulic Company of Racine, Wisc.:

Double solenoid valve V1 — a Model N 999 300, MD06—PDNC—AA, four-way, three-position, all ports closed in neutral;
Double solenoid valve V2 — a Model 998536, MD06 – SDNC – AD – four-way, double solenoid, spring centered, with pressure open to tank in center position and both cylinder port blocked;
Single solenoid valve V3 – a Model N999303, three-way, two-position, pressure open to tank in neutral.

FIG. 5 shows the switches MSL and LM in neutral, the valves SV, VX, V1 and V2 in neutral, and the valves V3 and SV0 closed.

FIG. 5 shows that the pumps FSP and RSP are connected by a common supply line 59 to a fluid reservoir or tank R. The pressure port of pump FSP is connected by a fluid line 50 to port 5 of swivel valve DV and from thence by a supply line 50A to steering valve SV. A fluid return line 50B connects valve SV to port 7 of swivel valve DV and the latter is connected by a fluid return line 50C to reservoir R. Line 50 is also connected to cut-in valve V3 by a branch line 50D.

Steering valve SV is provided with fluid lines 51 and 52 which are connected to the ports 8 and 6, respectively, of swivel valve DV and from thence, by fluid lines 51A and 52A, respectively as follows: Line 51A is connected to the base end of cylinder LFC and the rod end of cylinder RFC; line 52A is connected to the base end of cylinder RFC and the rod end of cylinder LFC. The lines 51A and 52A have branch lines 51B and 52B, respectively, which are connected to directional valve V1.

Directional valve V1 is connected by fluid lines 57 and 58 to centering valve V2. The lines 57 and 58 are connected by branch lines 57A and 58A, respectively, as follows: Line 57A connects to the rod end of cylinder LRC and to the base end of cylinder RRC; line 58A connects to the base end of cylinder LRC and to the rod end of cylinder RRC.

Centering valve V2 is connected by a line 56 to cut-in valve V3 and by a line 60 to the regulating port of a regulating valve 68. The return port of valve 68 is connected by a return line 61 to reservoir R. The input port of valve 68 is connected by a line 62 to outrigger valve VX, which is understood to be solenoid operated by a switch (not shown) in operator's cab C.

The pressure port of pump RSP is connected by a fluid line 55 to the input port of a regulating valve 67. The return port of valve 67 is also connected by return line 61 to reservoir R. The regulating port of valve 67 is connected by a line 64 to outrigger valve VX.

Outrigger valve VX is provided with a fluid line 70 which is connected to a manually operable valve bank SVO, operated by a lever SVW. Valve SVO is connected by pressure fluid lines 70A to the cylinder ends of the four outrigger cylinders 38. Outrigger valve VX is also provided with a fluid line 72 which is connected directly to the rod ends of each of the four outrigger cylinders 38.

A pump 19, also driven by engine 16, is provided to supply operating fluid to a swing cylinder or motor 19D to effect rotation of upper crane unit 12 on lower unit 11. Pump 19 is supplied from reservoir R through a line 19A and supplies fluid through a line 19B to a port 1 of swivel valve DV. Port 1 is connectable through either port 2 or 3 by means of a manually operable control valve V to energize swing cylinder 19D for rotation in opposite directions. Aa return port 4 on swivel valve DV is available to discharge return fluid from either port 2 or 3 to reservoir R through line 19C.

As hereinbefore mentioned and as FIG. 5 shows, valve V1 is operated by two solenoids V1S and V1SS; valve V2 is operated by two solenoids V2S and V2SS and valve V3 is operated by a single solenoid V3S. All solenoids are grounded on one side to the vehicle frame. The electrical circuitry for the system shown in FIG. 5 comprises a source of electrical power, such as battery BA, which is grounded to the vehicle frame on one side and connected on its other side to a movable contact 90 in mode selector switch MSL and to one side of normally open relay contacts 91 and 92 in a steering relay assembly SRA. The other sides of the relay contacts 91 and 92 are connected through a relay coil RC3 to ground. A stationary (tight steer) contact 94 in selector switch MSL is connected by an electrical conductor 95 to solenoid V1SS and by an electrical conductor 96 to one side of a first relay coil RC1 in relay assembly SRA. A stationary (crab) contact 97 in selector switch MSL is connected by an electrical conductor 98 to one side of a second relay coil RC2 in relay assembly SRA. The relay coils RC1 and RC2 are grounded on one side to the vehicle frame. Energization of the relay coils RC1 and RC2 effects closure of the relay contacts 91 and 92, respectively.

Energization of relay coil RC3 effects operation of a normally open relay contact 99 and a normally closed relay contact 100. The contacts 99 and 100 are both connected on one side to battery BA. The other side of contact 99 is connected to solenoid V3S by a conductor 101. The other side of contact 100 is connected by a conductor 102 to the spring-centered movable contact 103 of limit switch LM. The stationary contacts 105 and 107 of switch LM are connected by conductors 106 and 108, respectively, to the solenoid coils V2S and V2SS, respectively.

Figure 6:
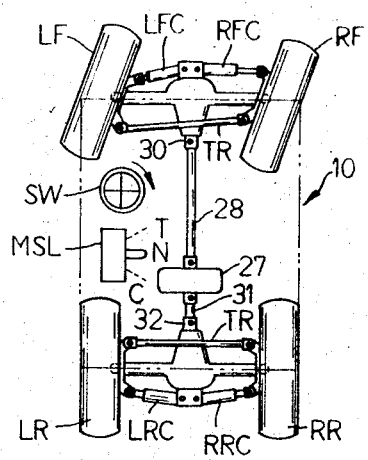
FIG. 6 is a top plan schematic view showing the front vehicle wheels turned right.
Figure 7:
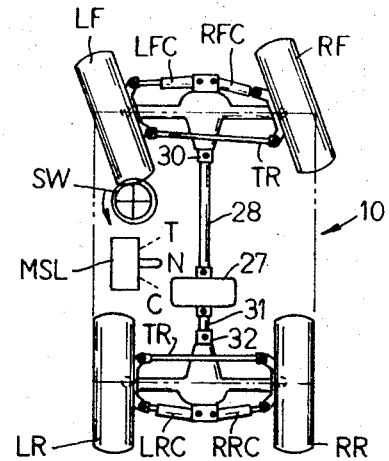
FIG. 7 is a view similar to FIG. 6 showing the front vehicle wheels turned left.
Figure 8:
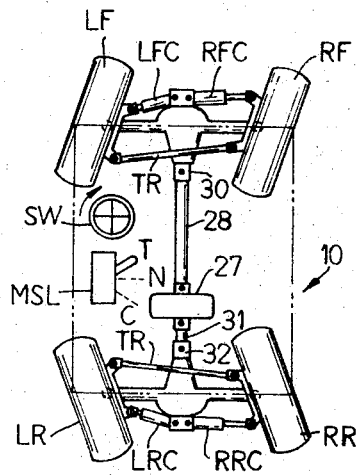
FIG. 8 is a view similar to FIG. 6 showing the front wheels turned right and the rear wheels turned left.
Figure 9:
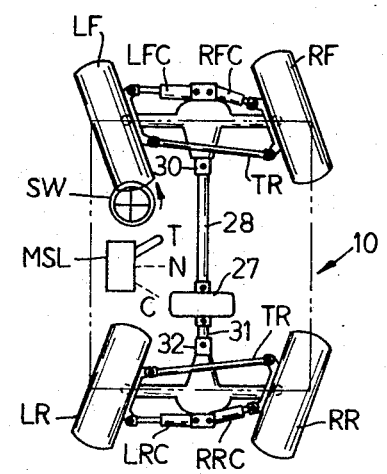
FIG. 9 is a view similar to FIG. 6 showing the front wheels turned left and the rear wheels turned right.
Figure 10:
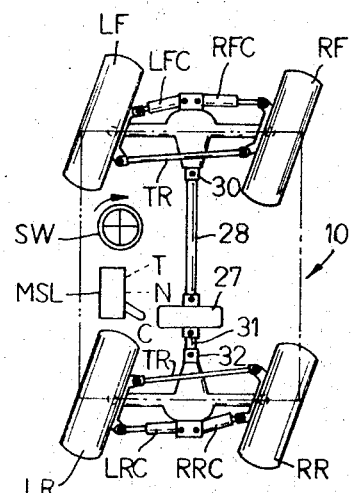
FIG. 10 is a view similar to FIG. 6 showing the front wheels turned right and the rear wheels turned right.
Figure 11:
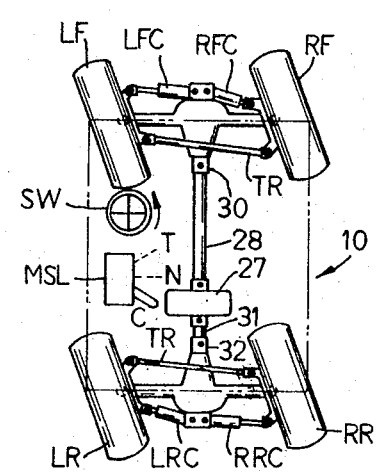
FIG. 11 is a view similar to FIG. 6 showing the front wheels turned left and the rear wheels turned left.

Generally considered, the system shown in FIG. 5 operates as following, assuming that both pumps FSP and RSP are in operation, and that all components are in the condition shown in FIG. 5. First, the vehicle operator sets mode selector switch MSL in any one of its three positions, namely, conventional steer N, tight steer T or crab steer C. If conventional steer position N of switch MSL is selected, turning of steering wheel SW in either direction only effects corresponding turning movement of the front vehicle wheels and the rear vehicle wheels remain straight (FIGS. 6 and 7). If tight steer position T of switch MSL is selected, turning of steering wheel SW in either direction effects corresponding turning movement of the front vehicle wheels and opposite turning movement of the rear vehicle wheels (FIGS. 8 and 9). If crab steer position C of switch MSL is selected, turning of steering wheel SW in either direction effects corresponding turning movement of both the front and rear vehicle wheels (FIGS. 10 and 11).

It is to be noted that centering limit switch LM operates valve V2 in response to movement of the rear vehicle wheels to recenter the wheels after a steering operation is completed. More specifically, whenever the selector switch MSL 9 is returned to neutral position, centering limit switch LM operates valve V2 to cause the rear wheels to return to centered (straight) position. The front wheels do not have this feature because they respond directly to movements of steering wheel SW and steering valve SV. At any time during return of selector switch MSL to neutral, the rear wheels return to neutral and they do so independently of the position of the steering wheel SW.

The electro-hydraulic control circuit or steering system shown in FIG. 5 is operable to maintain the front and rear vehicle wheels straight, as shown in FIG. 5, or to move them in the various positions or directions as shown in FIGS. 6 through 11. To facilitate understanding of the operation of the steering system the following chart or table A is presented to show the relationships between the vehicle wheel positions and the conditions or positions of the components shown in FIG. 5. In connection with the following chart, it is to be assumed that both pumps FSP and RSP are in operation but that the solenoid valve VX for the outrigger cylinders 38 is deenergized and closed. In the chart, the letters N, R and L signify netural, right and left, respectively. The letters C and T signify crab and right positions, respectively. The designation " → " means movement from one position to another.

Table A

| Fig. | Wheel Position Front | Wheel Position Rear | Mode Selector Switch Position | Steering Wheel and Steering Valve SV Position | Directional Valve V1 Position | Cut-in Valve V3 Position | Centering Valve V2 Position | Limit Switch LM Position |
|---|---|---|---|---|---|---|---|---|
| 5 | Strgt. | Strgt. | N | N | N | Closed | N | N |
| 6 | Right | Strgt. | N | R | N | Closed | N | N |
| 7 | Left | Strgt. | N | L | N | Closed | N | N |
| 8 | Right | Left | T | R | B | Open | A → N | R |
| 9 | Left | Right | T | L | B | Open | B → N | L |
| 10 | Right | Right | C | R | A | Open | A → N | L |
| 11 | Left | Left | C | L | A | Open | B → N | R |

DETAILED DESCRIPTION OF OPERATION

Figure 4:
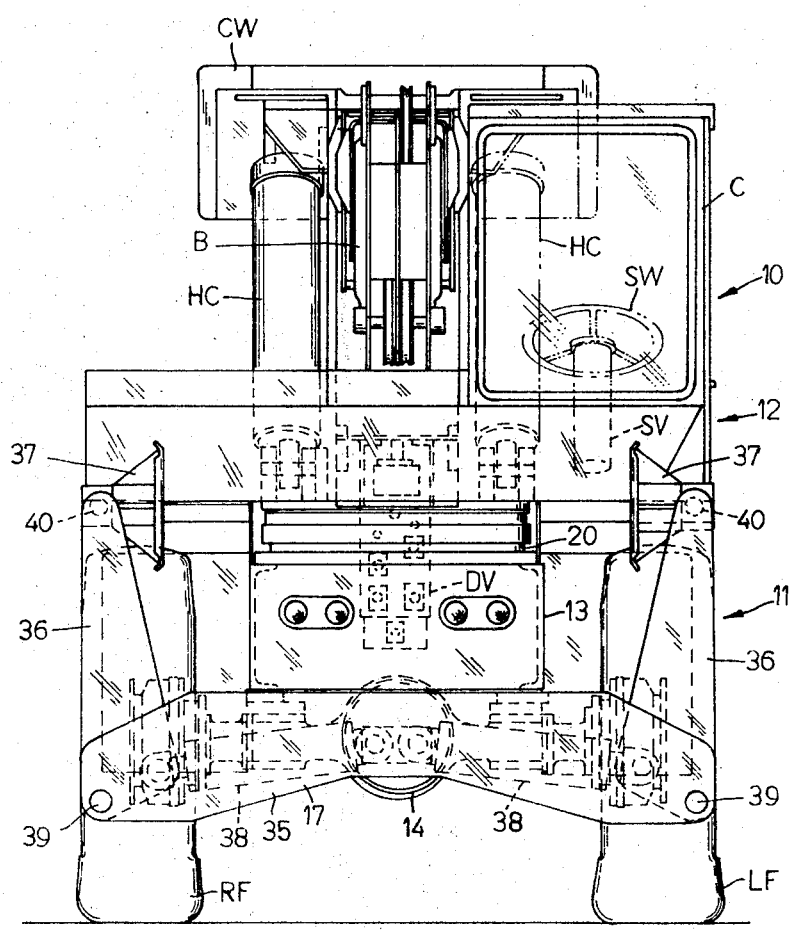
FIG. 4 is a front end elevational view of the vehicle shown in FIG. 1.

Referring to FIGS. 3 and 5 through 11 and to Table A. initially make the assumption that the vehicle wheels are straight as shown in FIG. 3; that the operating components are in the positions shown in FIG. 5 and in the condition shown in the first line designated FIG. 4 in Chart A; and that engine 16 and the pumps FSP and RSP and 19 are functioning.

To steer the front wheels alone in conventional steer in either direction, as shown in FIGS. 6 and 7, the mode selector switch MSL is kept in the neutral position N and steering wheel SW is operated in the appropriate direction. As Chart A indicates, only steering valve SV (operated directly in the appropriate direction by steering wheel SW) functions so as to enable pump FSP to supply fluid through lines 50 and 50A to either line 51 or 52 to operate the cylinders LFC and RFC in the appropriate direction. The valves V1 and V2 remain in enutral and valve V3 remains closed. Switch LM remains in neutral since the rear wheels LR and RR remain straight.

To steer the front wheels and the rear wheels together in tight steer in either direction, as shown in FIGS. 8 and 9, the mode selector switch MSL is placed in T position and the steering wheel SW is operated in the appropriate direction. As Chart A indicates, directional valve V1 assumes the B position, cut-in valve V3 opens and centering valve V2 assumes the A or B position, tending to move toward neutral. More specifically, with directional valve V1 in the B position, fluid is able to flow to the rear cylinders LRC and RRC, as well as to the front cylinders LFC and RFC. To supplement the flow from pump FSP (now that four cylinders instead of two require fluid), fluid from pump RSP flows through line 55, through regulating valve 67 through open cut-in valve V3, through line 56, and through centering valve V2 to the lines 57A or 57B (depending on steer direction) to the cylinders LRC and RRC. It is to be noted that the limit switch LM is unable to effect energization of te coils V2S and V2SS of valve V2 unless and until the toggle of mode selector switch MSL is returned to its neutral position N from its position T. However, when the toggle of switch MSL is returned to neutral, the coils V2S or V2SS are energized to cause valve V2 to assume a condition whereby valve V2 directs fluid flow to the cylinders LRC and RRC to cause them to return to their centered (Wheel straight) position.

To steer the front wheels and the rear wheels together in crab steer in either direction, as shown in FIGS. 10 and 11, the mode selector switch MSL is placed in C position and the steering wheel SW is operated in the appropriate direction. As Chart A indicates, directional valve V1 assumes the A position, cut-in valve V3 opens and centering valve V2 assumes the A or B position, tending to move toward neutral. More specifically, operation of the steering mechanism in crab steer is similar to that in right steer, except the direction of rear wheel movement is reversed. Specifically, in crab steer, pump RSP supplements pump FSP and limit switch LM comes into play to center the rear wheels when the toggle of switch MSL is returned to neutral position N from position C.

I Claim:

1. In a vehicle comprising steerable front and rear wheels; front and rear steering actuators for said front and rear wheels, respectively, and operable to move said wheels to steer said vehicle; a pump for supplying operating fluid to said steering actuators; a steering wheel; a steering valve operable in response to movement of said steering wheel to direct fluid from said pump to said front steering actuator; control means including a mode selector device having conventional, crab and tight steer positions and a mode valve; said control means when said mode selector device is in conventional steer position effecting operation of said mode valve to prevent said pump from supplying fluid to said rear steering actuator; said control means when in said mode selector device is in either crab or tight steer position effecting operation of said mode valve to connect said steering valve to direct fluid to said rear steering actuator, said control means further comprising a centering valve and means responsive to rear wheel position to operate said centering valve to direct fluid to said rear steering actuator to effect return of said rear wheels to straight position when said mode selector device is returned to conventional steer position, regardless of the positions of said steering wheel and of said front wheels.

2. In a vehicle comprising at least one component operable to perform a function and steerable front and rear wheels: a first hydraulic actuator for said component; a first pump for supplying fluid to said first actuator; front and rear steering actuators for said front and rear wheels, respectively, and operable to move said wheels to steer said vehicle; a second pump for supplying fluid to said steering actuators; a steering wheel; a steering valve operable in response to movement of said steering wheel to direct fluid from said second pump to said front steering actuator; a mode valve; a cut-in valve; control means including a selectively operable mode selector device having conventional, crab and tight steer positions;

said control means when said mode selector device is in conventional steer position effecting operation of said mode valve to prevent said second pump from supplying fluid to said rear steering actuator; said control means when said mode selector device is in either crab or tight steer position effecting operation of said mode valve to connect said steering valve to direct fluid to said rear steering actuator, and further operable to actuate said cut-in valve to connect said first pump to supplement the fluid supply from said second pump, and a centering valve responsive to rear wheel position when said mode selector device is returned to conventional steer position to connect said first pump to supply fluid to said rear steering actuator to effect return of said rear wheels to straight position, regardless of the positions of said steering wheel and said steering valve.

3. A vehicle according to claim 2 wherein said mode valve, said cut-in valve, and said centering valve are solenoid operated valves; wherein said mode selector device is a multiposition electric switch; and including a limit switch responsive to rear wheel position for effecting operation of said solenoid operated centering valve.

4. In a vehicle comprising at least one component operable to perform a function and steerable front and rear wheels:

a first hydraulic actuator for said component;
a first pump for supplying fluid to said first actuator;
first selectively operable valve means to direct fluid from said first pump to operate said first actuator;

front and rear steering actuators for said front and rear wheels, respectively, and operable to move said wheels to steer said vehicle;
a second pump for supplying fluid to said steering actuators;
a selectively operable multiposition steering valve operable to direct fluid from said second pump to said front steering actuator;
a multiposition mode valve;
a multiposition cut-in valve;
selectively operable mode selector means having conventional, crab and tight steer positions;
said mode selector means when in either crab or tight steer position effection operation of said mode valve to direct fluid from said steering valve to supply said rear steering actuator, and further operable to actuate said cut-in valve to connect said first pump to supplement the fluid supply from said second pump, said mode selector means when in conventional steer condition affecting operation of said mode valve to prevent said second pump from supplying fluid to said rear steering actuator; and a multiposition valve responsive to rear wheel position when said mode selector means is in conventional steer position to connect said first pump to said rear steering actuator.

* * * * *